United States Patent
Hsu

(10) Patent No.: US 8,925,395 B2
(45) Date of Patent: Jan. 6, 2015

(54) FORCE MEASURING DEVICE FOR A BICYCLE

(75) Inventor: Ching-Feng Hsu, Taipei (TW)

(73) Assignee: Hong-Jun Xu, Wuxi (CN)

( * ) Notice: Subject to any disclaimer, the term of this patent is extended or adjusted under 35 U.S.C. 154(b) by 125 days.

(21) Appl. No.: 13/547,188

(22) Filed: Jul. 12, 2012

(65) Prior Publication Data
US 2013/0014596 A1      Jan. 17, 2013

(30) Foreign Application Priority Data

Jul. 13, 2011   (TW) .............................. 100212838 U

(51) Int. Cl.
G01L 1/04 (2006.01)
G01L 1/22 (2006.01)
G01L 3/14 (2006.01)

(52) U.S. Cl.
CPC .................................. *G01L 3/1435* (2013.01)
USPC .................................................... 73/862.635

(58) Field of Classification Search
CPC .......... G01L 1/2231; G01L 1/12; G01L 1/122
USPC .................................................... 73/862.635
See application file for complete search history.

(56) References Cited

U.S. PATENT DOCUMENTS

| | | | |
|---|---|---|---|
| 5,027,303 A * | 6/1991 | Witte ........................ | 73/862.338 |
| 6,199,021 B1 * | 3/2001 | Cote et al. ................. | 73/862.322 |
| 6,356,848 B1 * | 3/2002 | Cote et al. ................. | 73/862.322 |
| 6,439,067 B1 * | 8/2002 | Goldman et al. ......... | 73/862.333 |
| 7,061,228 B2 * | 6/2006 | Ichida et al. ............... | 73/514.39 |
| 8,006,574 B2 * | 8/2011 | Meyer ....................... | 73/862.321 |
| 2005/0178210 A1 * | 8/2005 | Lanham .......................... | 73/818 |
| 2009/0114040 A1 * | 5/2009 | Mizuno ...................... | 73/862.69 |
| 2009/0119032 A1 * | 5/2009 | Meyer ............................. | 702/44 |
| 2009/0120208 A1 * | 5/2009 | Meyer ...................... | 73/862.045 |
| 2009/0120210 A1 * | 5/2009 | Phillips et al. ........... | 73/862.338 |
| 2009/0120211 A1 * | 5/2009 | Roovers et al. .......... | 73/862.474 |
| 2010/0109462 A1 * | 5/2010 | Calley et al. ..................... | 310/90 |
| 2010/0116066 A1 * | 5/2010 | Mizuno ....................... | 73/862.69 |
| 2011/0169381 A1 * | 7/2011 | Calley et al. ................ | 310/67 R |
| 2012/0022800 A1 * | 1/2012 | Lubarsky ................. | 73/862.326 |
| 2012/0152033 A1 * | 6/2012 | Hsiao .......................... | 73/862.69 |
| 2012/0234108 A1 * | 9/2012 | Janecek et al. ........... | 73/862.338 |

FOREIGN PATENT DOCUMENTS

EP      1923683 A1      5/2008

OTHER PUBLICATIONS

European Extended Search Report Dated Dec. 17, 2012 for EP Application No. 12176396.5.

* cited by examiner

*Primary Examiner* — Lisa Caputo
*Assistant Examiner* — Philip Cotey
(74) *Attorney, Agent, or Firm* — Vedder Price, P.C.

(57) ABSTRACT

A force measuring device for a bicycle includes a sleeve shell having a first shell-half outer wall and an inner tubular wall which are disposed between a bottom bracket shell and a spindle, a ring body disposed on the inner tubular wall and having a strain region which is configured to make a strain displacement corresponding to a treading force exerted on the spindle, a sensor holding unit defining a sensor activating zone and a hall sensing unit including a sensor which is disposed in the sensor activating zone, and a magnetic member which is displaceable with the straining movement to change a magnetic field generated thereby so as to give off a signal indicative of the magnitude of the treading force.

20 Claims, 15 Drawing Sheets

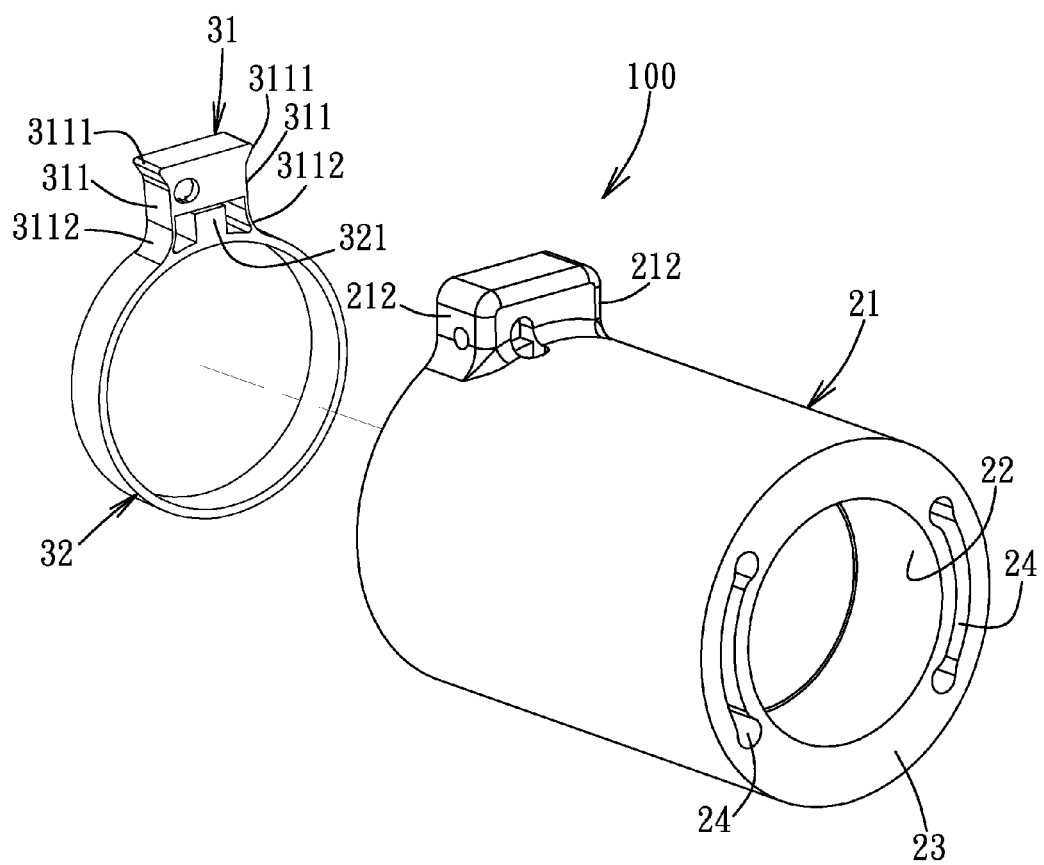
F I G. 4

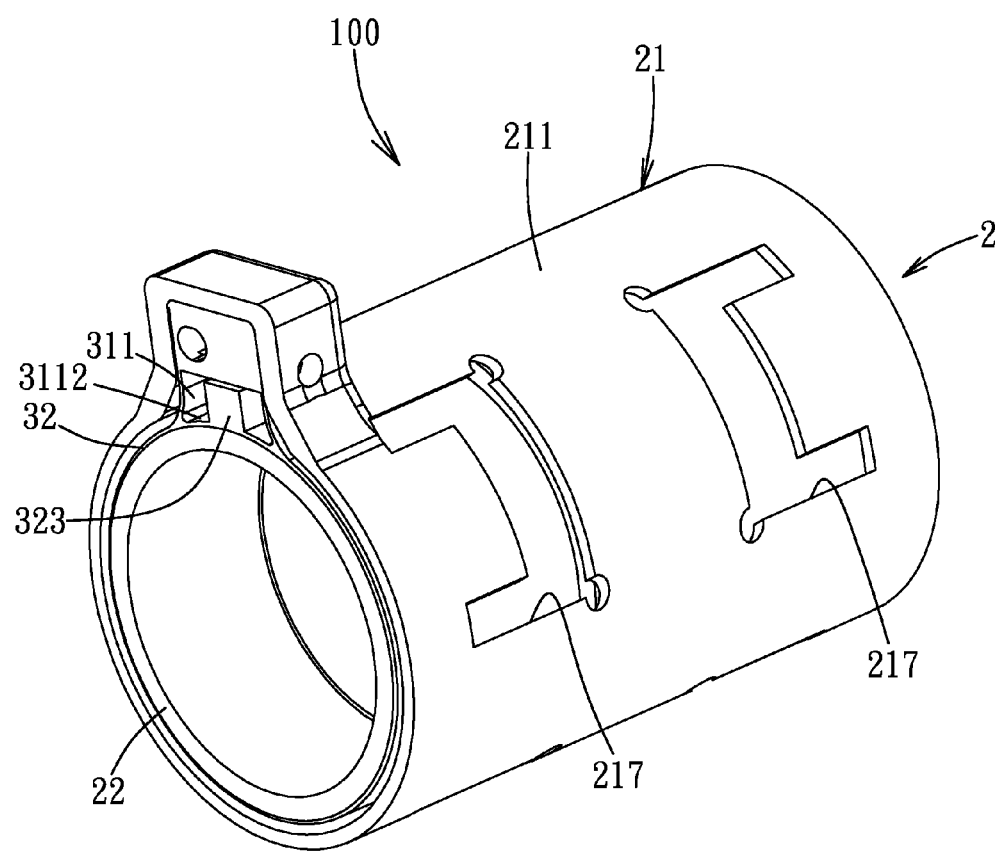
F I G. 6

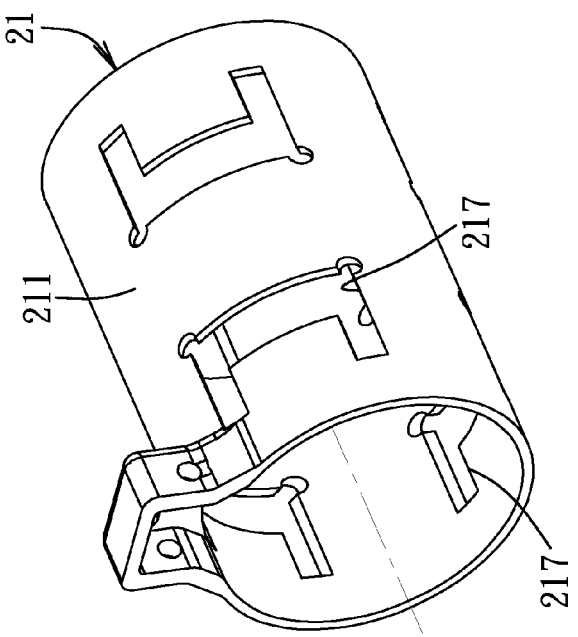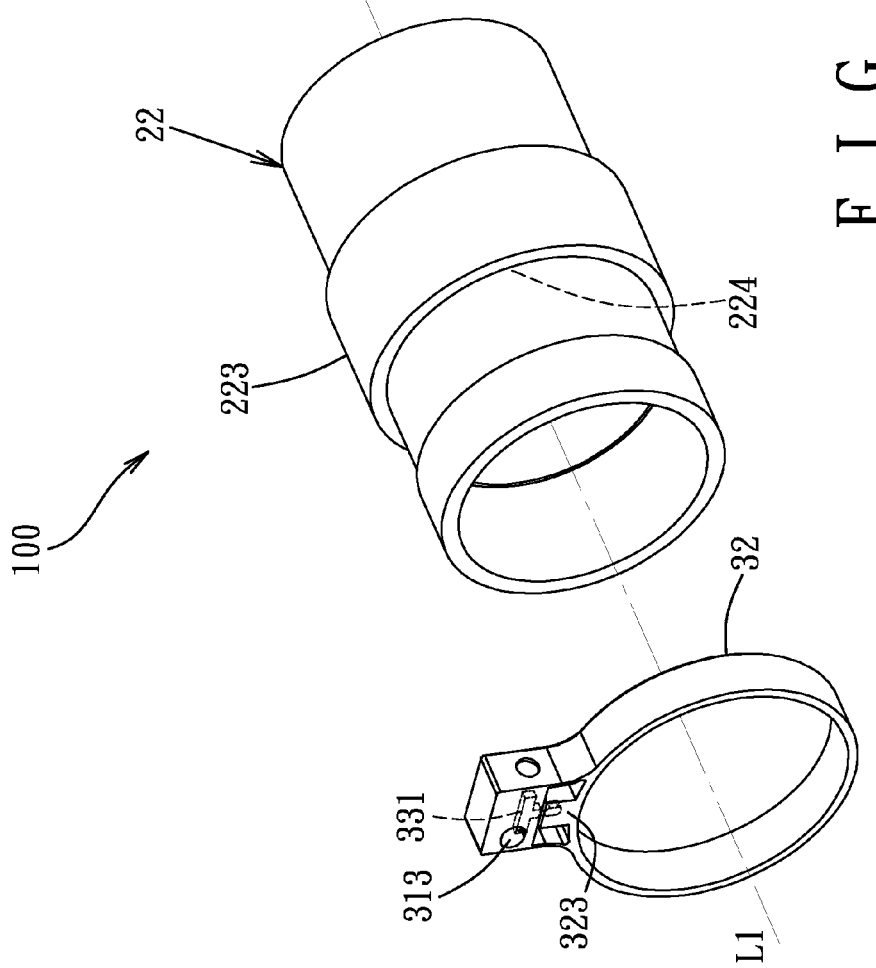

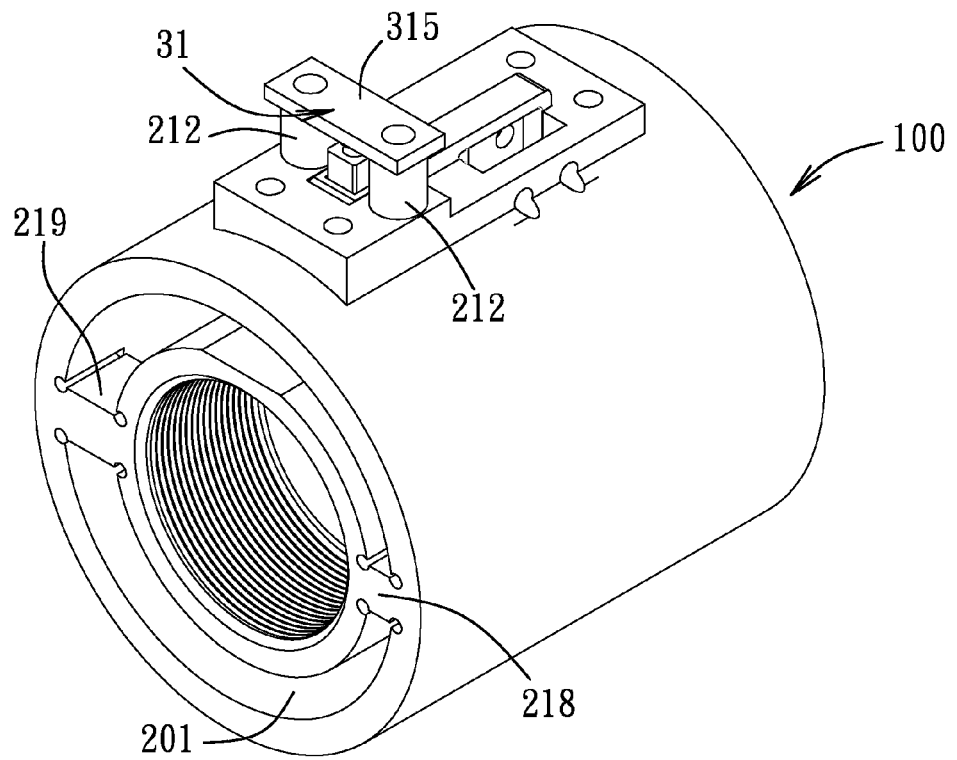
F I G. 12
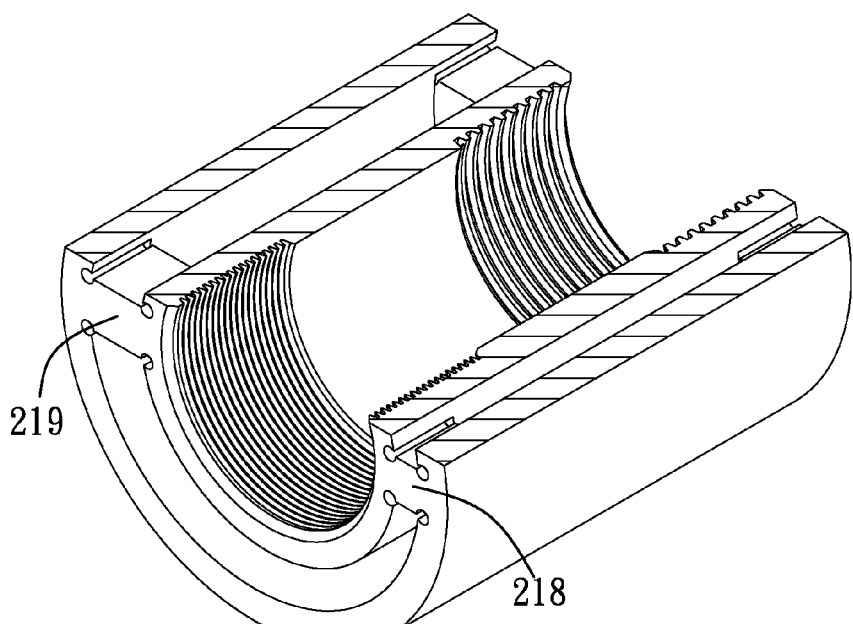
F I G. 13

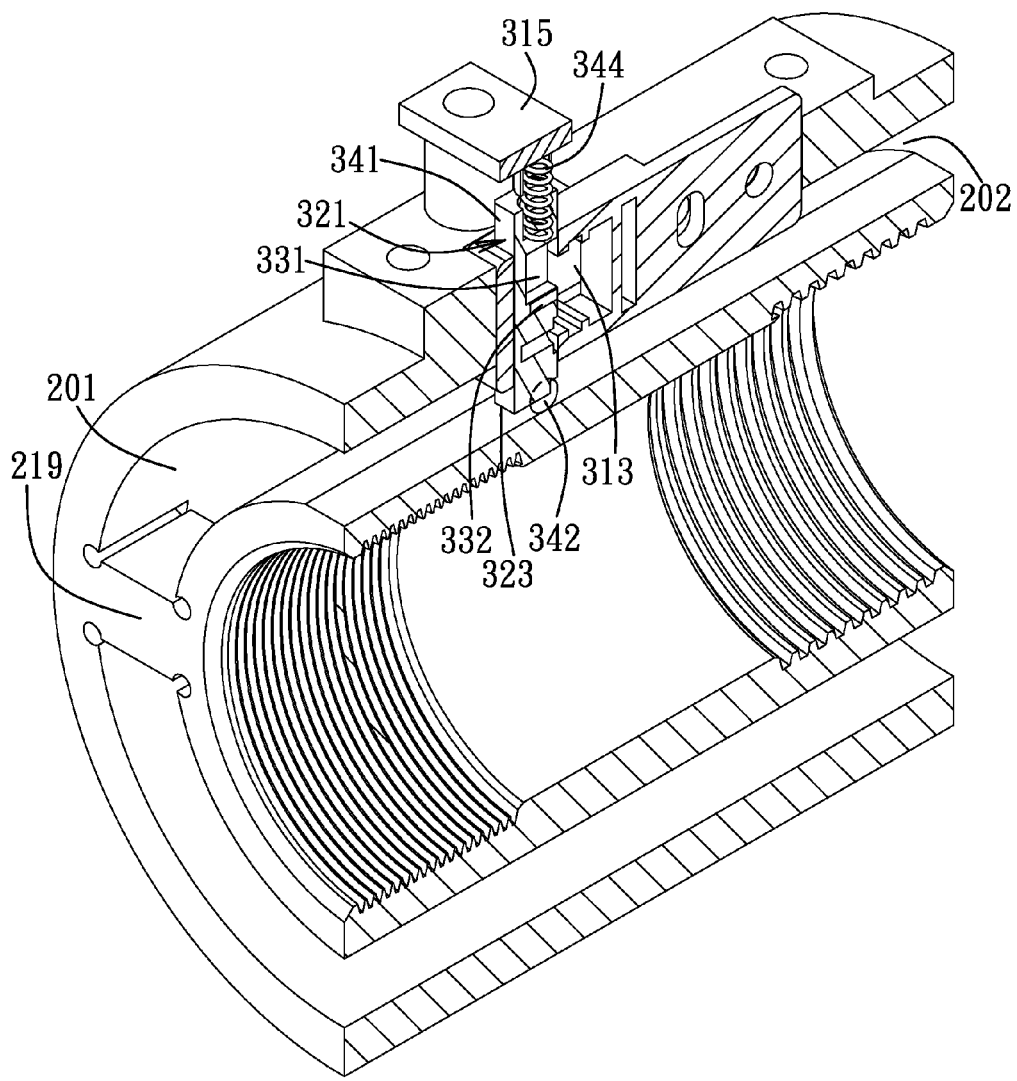
F I G. 14

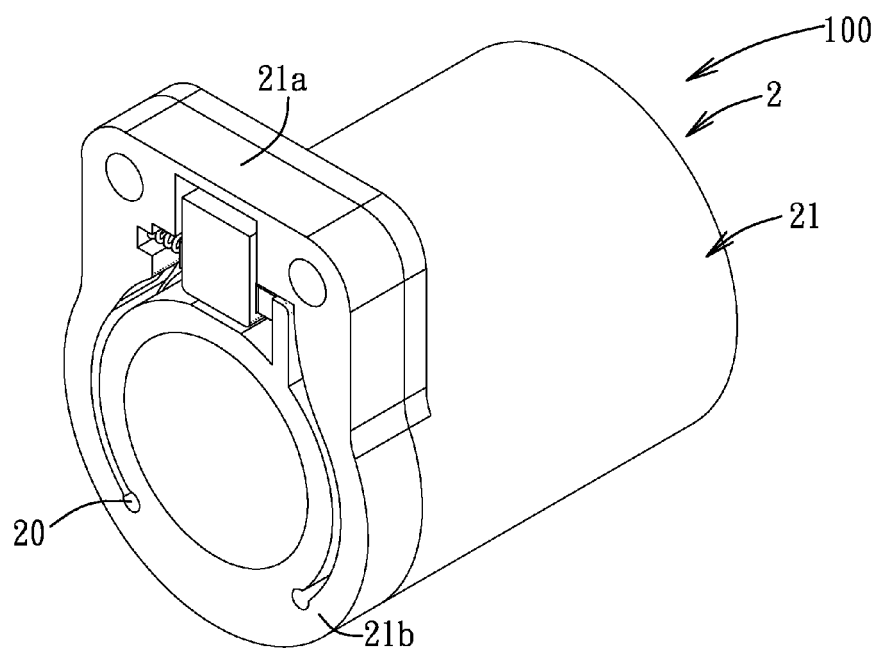
F I G. 19
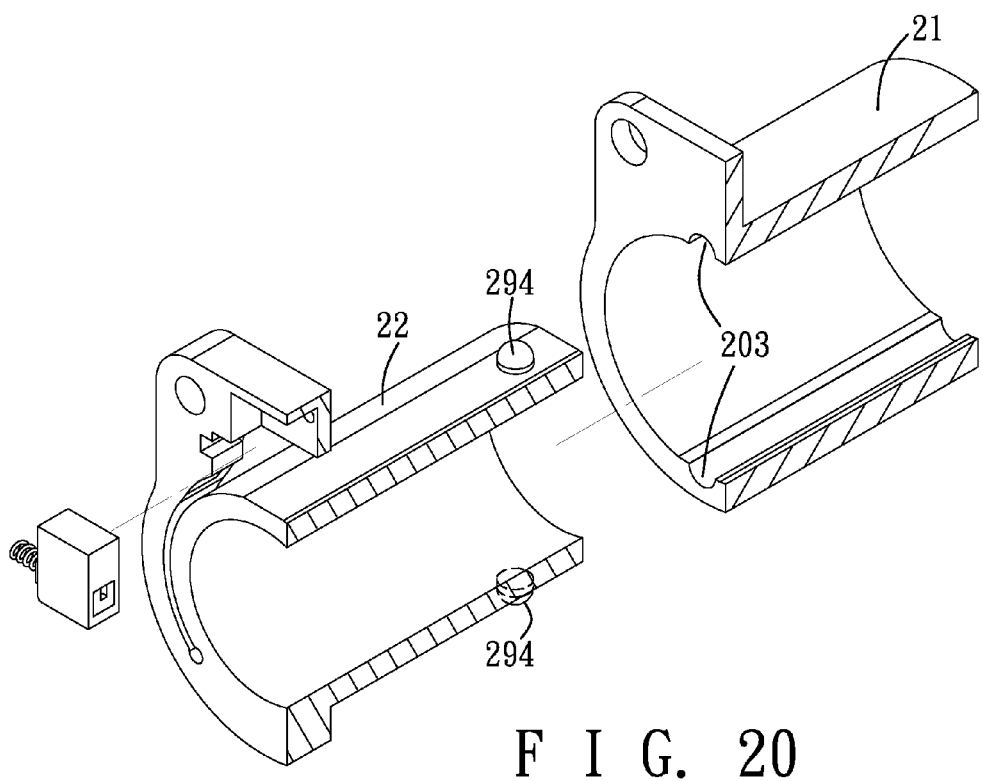
F I G. 20

FORCE MEASURING DEVICE FOR A BICYCLE

CROSS-REFERENCE TO RELATED APPLICATION

This application claims priority of Taiwanese Patent application no. 100212838, filed on Jul. 13, 2011.

BACKGROUND OF THE INVENTION

1. Field of the Invention

This invention relates to a force measuring device, more particularly to a force measuring device adapted for mounting in a bottom bracket of a bicycle.

2. Description of the Related Art

Generally, the treading force exerted by a cyclist during cycling will cause deformation of the bicycle frame, i.e., a displacement of two construction parts relative to each other. A measuring device is employed to measure such a displacement for calculating a magnitude of the force which is exerted on the bicycle by a bicycle chain. Such measurement data can be collected and subsequently analyzed and recorded. Conventional bicycle chain force measuring devices are typically mounted on a rear wheel axle since the bending occurring in the rear wheel axle is a good measure of the tension present in a bicycle chain, such as those disclosed in WO 03/073057 A1, WO 01/30643 A1, and U.S. Pat. No. 7,814,800 B2. However, the bending of the rear wheel axle which is to be measured is not truly representative of the treading force since the treading force is transmitted to the rear wheel axle from crank arms through a chainwheel and a chain.

SUMMARY OF THE INVENTION

An object of the present invention is to provide a force measuring device which is adapted to be mounted in a bottom bracket assembly of a bicycle so as to accurately measure a force exerted on a crank axle of the bicycle. The bottom bracket assembly includes a bottom bracket shell which is connected to a seat tube, a down tube, and chain stays of the bicycle, and which has a right shell segment, a spindle to which a crankset and a chainwheel are connected, which is rotatably mounted relative to the bottom bracket shell about a spindle axis, and which has a right spindle segment that is spacedly surrounded by the right shell segment, and an antifriction bearing unit which is disposed between the spindle and the bottom bracket shell.

According to this invention, the force measuring device comprises a sleeve shell, a ring body, a sensor holding unit, and a hall sensing unit. The sleeve shell is configured to be inserted between the spindle and the bottom bracket shell of the bottom bracket assembly, and has a first shell-half outer wall and an inner tubular wall which are radially spaced apart from each other to define a circumferentially extending surrounding clearance, and which are adapted to be in abutting engagement with the right shell segment of the bottom bracket shell and the antifriction bearing unit, respectively. The ring body is disposed on and movable with the inner tubular wall, and has an outer ring surface that confronts and is spaced apart from the first shell-half outer wall. The outer ring surface has a strain region which is configured to make a strain displacement corresponding to a treading force exerted on the spindle. The sensor holding unit defines a sensor activating zone confronting the strain region and is disposed to be unmoved with the first shell-half outer wall. The hall sensing unit includes a sensor that is disposed in the sensor activating zone and that is held to be unmoved relative to the sensor holding unit, and a magnetic member that is disposed to be displaceable with the strain displacement of the strain region and that is spaced apart from the sensor by a predetermined distance such that a magnetic field generated thereby is changed when the magnetic member is displaced with the strain displacement so as to give off a signal indicative of the magnitude of the treading force.

BRIEF DESCRIPTION OF THE DRAWINGS

Other features and advantages of the present invention will become apparent in the following detailed description of the preferred embodiments of the invention, with reference to the accompanying drawings, in which:

FIG. 4 is an exploded perspective view of the first preferred embodiment taken from another angle;

FIG. 6 is a perspective view of a second embodiment of the force measuring device according to this invention;

FIG. 7 is a partly exploded perspective view of the second preferred embodiment;

FIG. 12 is a perspective view of a fourth preferred embodiment of the force measuring device according to this invention;

FIG. 13 is a partly sectioned, perspective view of the fourth preferred embodiment;

FIG. 14 is another partly sectioned, perspective view of the fourth preferred embodiment;

FIG. 19 is a perspective view of a eighth preferred embodiment of the force measuring device according to this invention; and FIG. 20 is a partly sectioned, exploded perspective view of the eighth preferred embodiment.

DETAILED DESCRIPTION OF THE PREFERRED EMBODIMENT

Figure 1:
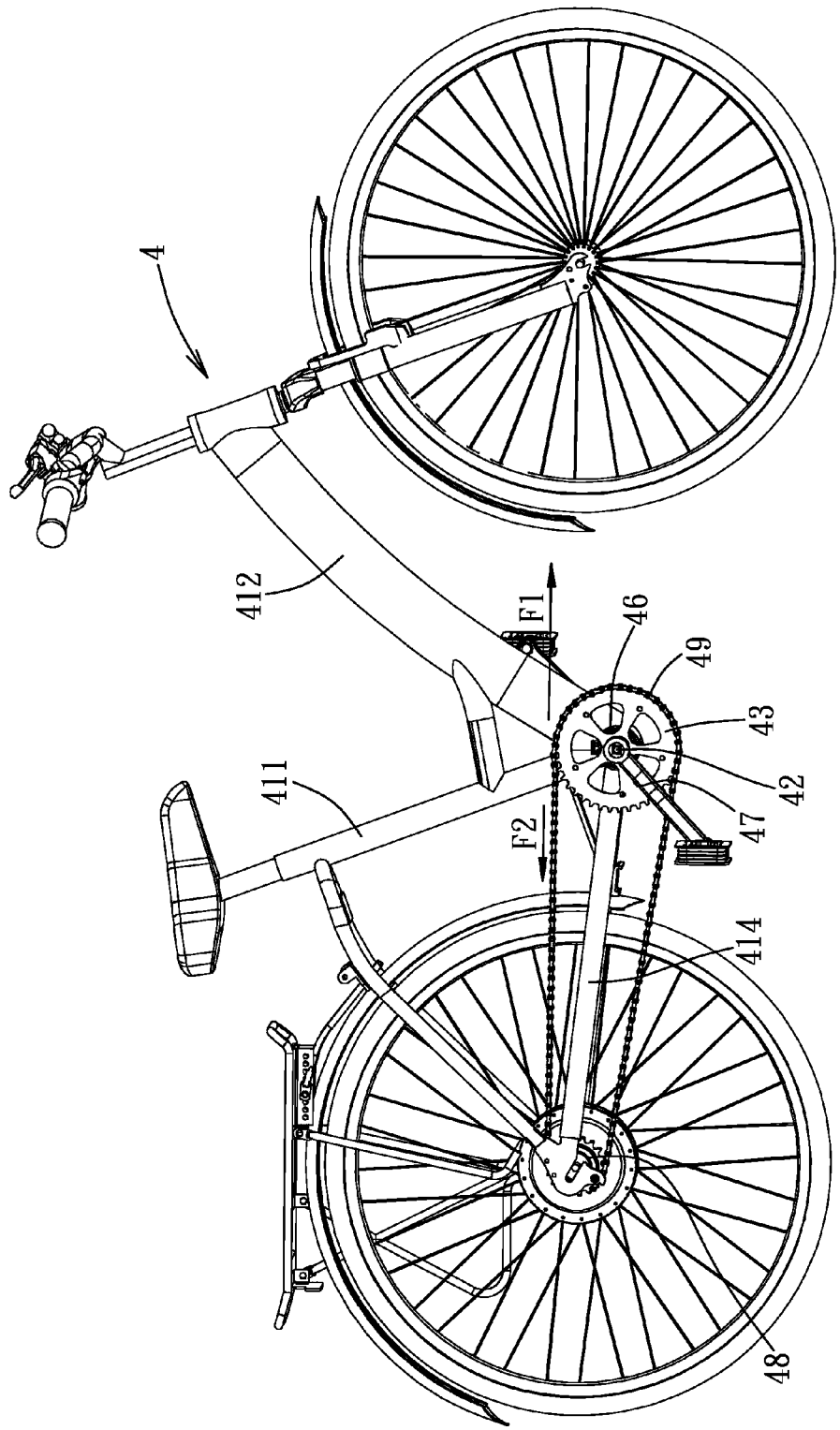
FIG. 1 is a schematic side view of a bicycle incorporating a force measuring device of this invention.
Figure 2:
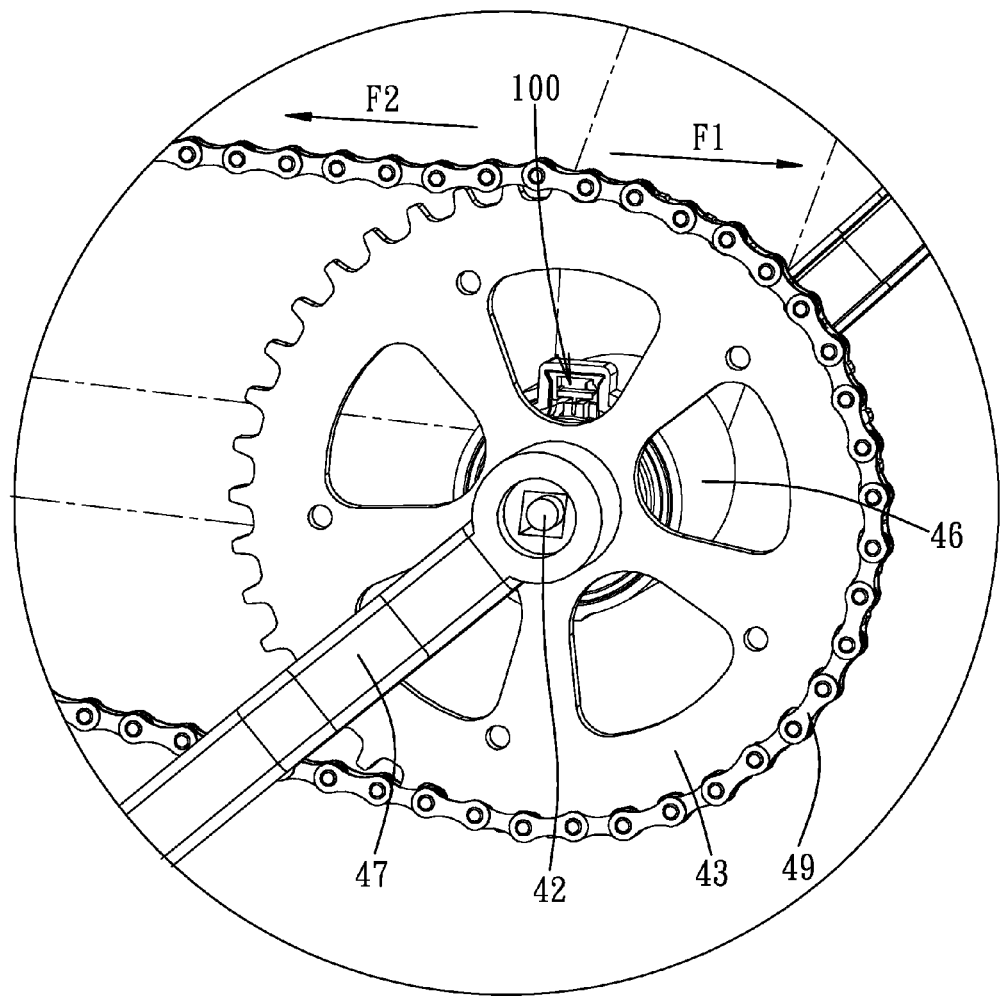
FIG. 2 is an enlarged perspective view of a first preferred embodiment of the force measuring device according to the present invention incorporated in a bottom bracket assembly of the bicycle.
Figure 3:
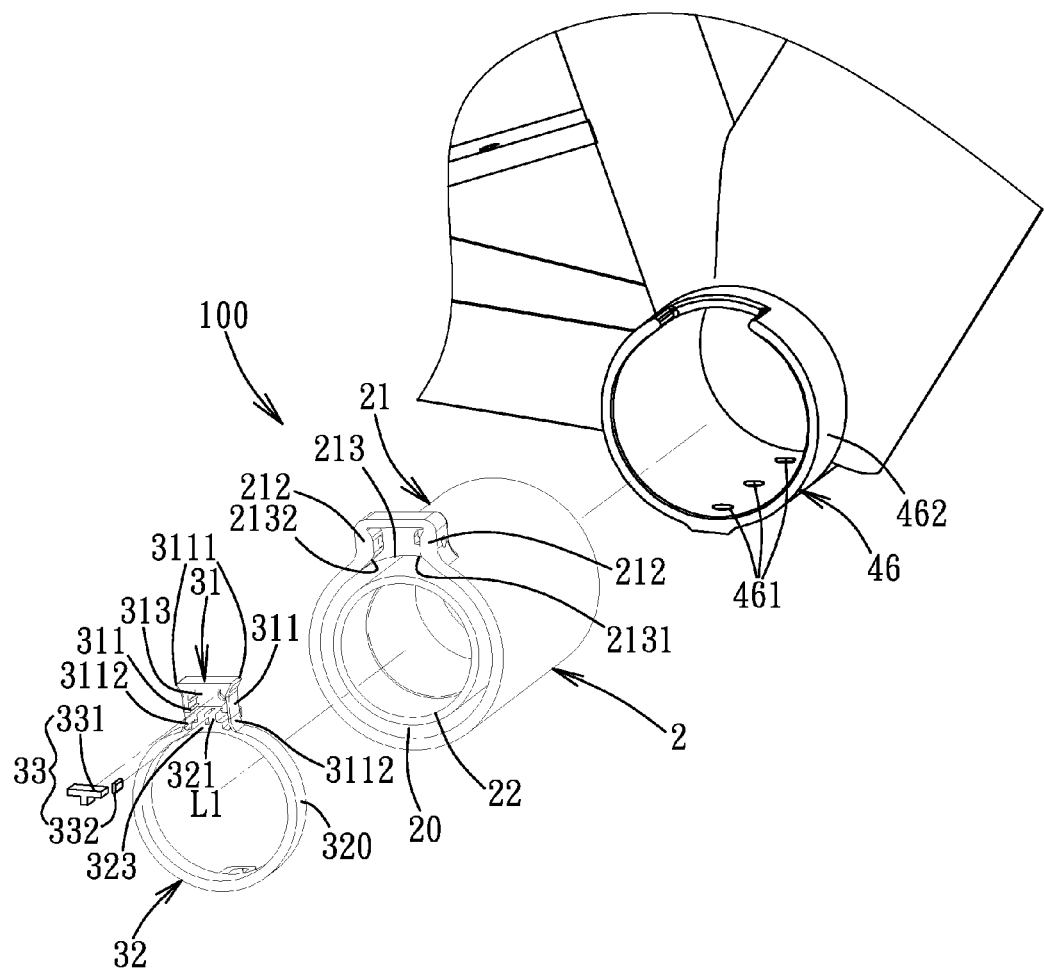
FIG. 3 is an exploded perspective view of the first preferred embodiment and the bottom bracket shell of a bottom bracket assembly.

Before the present invention is described in greater detail, it should be noted that same reference numerals have been used to denote like elements throughout the specification.

Referring to FIGS. 1 to 5, a first preferred embodiment of a force measuring device 100 according to the present invention is adapted to be mounted in a bottom bracket assembly of a bicycle 4.

The bottom bracket assembly includes a bottom bracket shell 46 which is connected to a seat tube 411, a down tube 412, and chain stays 414 of the bicycle 4, and which has a right shell segment 462. A spindle 42 to which a crankset 47 and a chainwheel 43 are connected is rotatably mounted relative to the bottom bracket shell 46 about a first spindle axis (L1) so as to transmit a treading force (F1) to a rear wheel axle 48 by a chain 49 to move the bicycle 4 in a forward direction transverse to a direction of the first spindle axis (L1). The spindle 42 has a right spindle segment 421 spacedly surrounded by the right shell segment 462. An antifriction bearing unit 40 is disposed between the spindle 42 and the bottom bracket shell 46. When the treading force (F1) is applied to move the spindle 42 as well as the chainwheel 43 and the chain 49 to move the bicycle 4 forward, a counterforce (F2) opposite to the treading force (F1) is generated to make slight movement of the spindle 46 relative to the bottom bracket shell 46. Such movement is detected and measured by the force measuring device 100 of this invention.

The force measuring device 100 of the first preferred embodiment comprises a sleeve shell 2, a ring body 32, a sensor holding unit 31, a force transmitting mount 321, and a hall sensing unit 33.

The sleeve shell 2 is configured to be inserted between the spindle 42 and the bottom bracket shell 46, and has outer and inner tubular walls 21, 22 which are radially spaced apart from each other to define a surrounding clearance 20 extending circumferentially, and which are in abutting engagement with the right shell segment 462 and the antifriction bearing unit 40, respectively.

The sleeve shell 2 has a tubular connecting wall 23 disposed to interconnect left ends of the outer and inner tubular walls 21, 22, and a pair of slots 24 which are diametrically opposite to each other, which are axially formed through the tubular connecting wall 23 to be in spatial communication with the surrounding clearance 20, and which extend circumferentially about the first spindle axis (L1) so as to evenly reduce the rigidity thereof. The tubular connecting wall 23 is distal from the ring body 32 and is adjacent to a left spindle segment 422 of the spindle 42 along the first spindle axis (L1).

The ring body 32 is disposed on and movable with the inner tubular wall 22, and has an outer ring surface 320 that confronts and is spaced apart from the outer tubular wall 21 and that has a strain region 323 configured to make a strain movement corresponding to the treading force (F1) exerted on the spindle 42. The force transmitting mount 321 is integrally formed with and is disposed on the strain region 323.

The sensor holding unit 31 is integrally formed with the ring body 32, is disposed to be unmoved with the outer tubular wall 21, and includes forward and rearward arms 311. The forward and rearward arms 311 are spaced apart from each other in the forward direction, extend upwardly from the strain region 323, cooperatively flank the force transmitting mount 321, and respectively have forward and rearward lower segments 3112 that are disposed on the strain region 323, and forward and rearward upper segments 3111 that respectively extend uprightly from the forward and rearward lower segments 3112 so as to cooperatively define a sensor activating zone 313 that confronts the strain region 323.

In this embodiment, the outer tubular wall 21 has marginal cutout portion 213 extending circumferentially to terminate at forward and rearward barrier surfaces 2131, 2132. The sensor holding unit 31 is fitted in the marginal cutout portion 213 such that the forward and rearward lower segments 3112 are respectively brought into abutting engagement with the forward and rearward barrier surfaces 2131, 2132 so as to ensure immovability of the sensor holding unit 31 relative to the outer tubular wall 21 when the strain region 323 makes the strain displacement.

Furthermore, the outer tubular wall 21 includes forward and rearward abutment legs 212 extending uprightly from the forward and rearward barrier surfaces 2131, 2132 respectively to abut against the forward and rearward upper segments 3111 of the forward and rearward arms 311, respectively, such that immovability of the sensor 331 relative to the outer tubular wall 21 is further ensured.

The hall sensing unit 33 includes a sensor 331 and a magnetic member 332. The sensor 331 is supported by the forward and rearward arms 311 and disposed in the sensor activating zone 313 so as to be held unmoved relative to the sensor holding unit 31 and the outer tubular wall 21 when the strain region 323 makes the strain displacement. The magnetic member 332 is spaced apart from the sensor 331 by a predetermined distance and is mounted in the force transmitting mount 321 that extends toward the sensor activating zone 313 to be displaceable with the strain displacement of the strain region 323.

A measuring module (not shown) is disposed in the sensor activating zone 313 and electrically connected to the sensor 331. Therefore, under the interaction of the treading force (F1) and the counterforce (F2), the magnetic member 332 is displaced with the strain movement of the strain region 323 and the ring body 32 relative to the sensor 331 to change a magnetic field generated thereby so as to give off a signal indicative of the magnitude of the treading force (F1).

Figure 5:
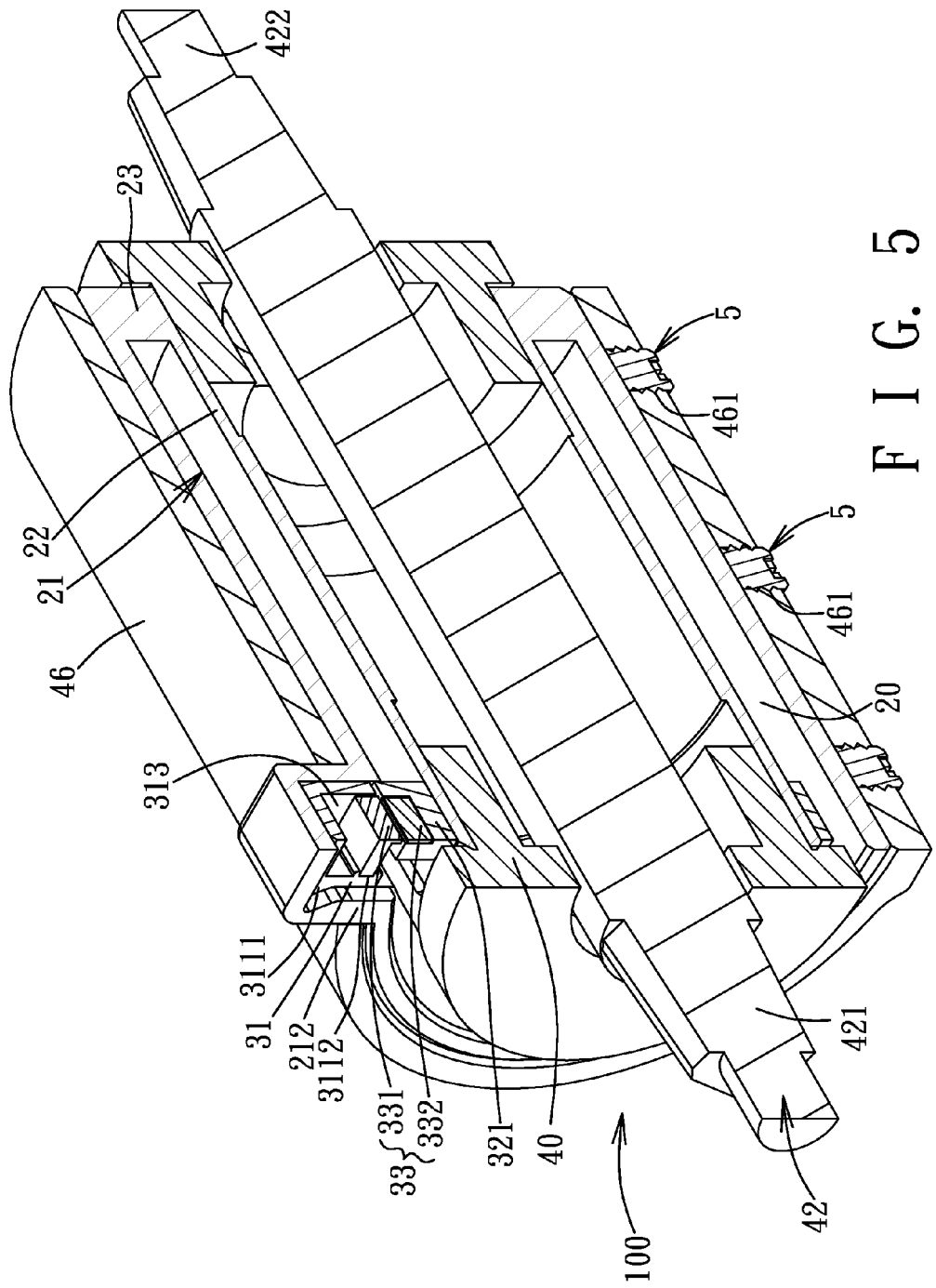
FIG. 5 is a partly sectioned, perspective view of the first preferred embodiment when mounted in the bottom bracket shell.

Additionally, as shown in FIG. 5, a plurality of fasteners 5 are disposed to be threadedly engaged with screw holes 461 formed in the bottom bracket shell 46 to abut against the sleeve shell 2 so as to detachably fasten the force measuring device 100 to the bottom bracket shell 46.

Figure 8:
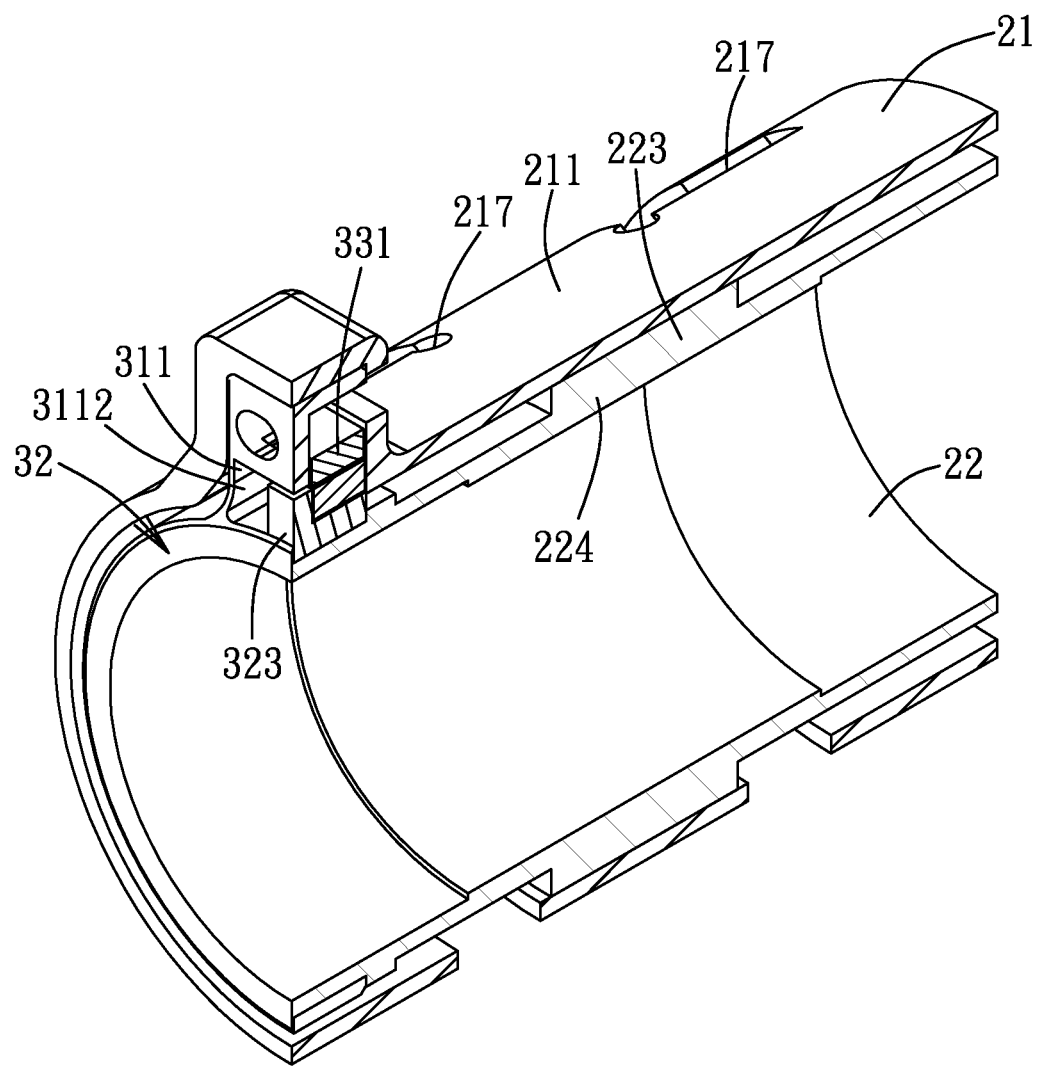
FIG. 8 is a partly sectioned, perspective view of the second preferred embodiment.

Referring to FIGS. 6 to 8, a second preferred embodiment of the force measuring device 100 according to this invention similar to the first embodiment in construction is shown. The main difference between the second embodiment and the first embodiment resides in that the sleeve shell 2 has a straining annular body 223 which is disposed to sleeve on a first middle segment 224 of the inner tubular wall 22 so as to moved therewith, and which is configured to abut against a second middle segment 211 of the outer tubular wall 21 so as to permit the second middle segment 211 to be strained by a straining force corresponding to the treading force (F1) exerted on the straining annular body 223.

The outer tubular wall 21 has a plurality of cutout slots 217 disposed between the second middle segment 211 thereof and the ring body 32 and angularly displaced from one another about the first spindle axis (L1) so as to permit the strain displacement to be enlarged when the straining force is transmitted through the rearward lower segment 3112 of the rearward arm 311 onto the strain region 323 thereby improving the sensibility of the sensor 331.

Figure 9:
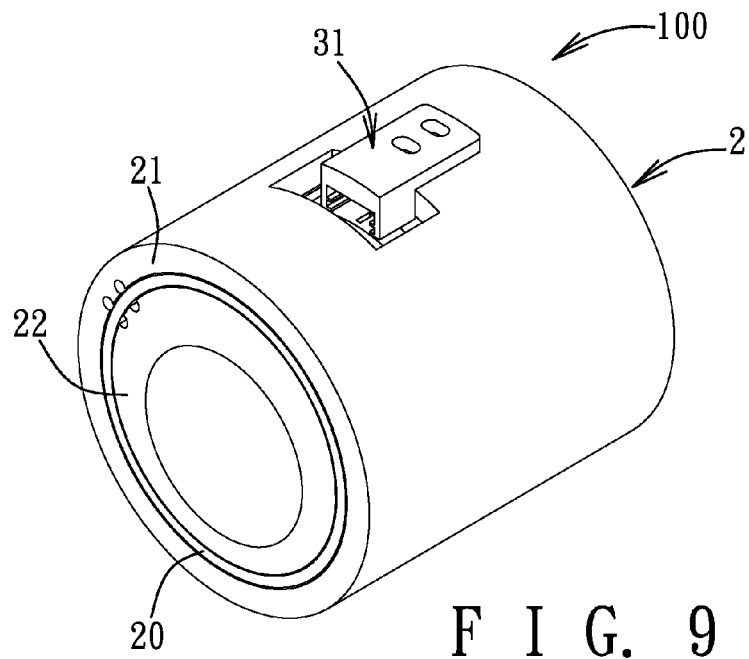
FIG. 9 is a perspective view of a third preferred embodiment of the force measuring device according to this invention.
Figure 10:
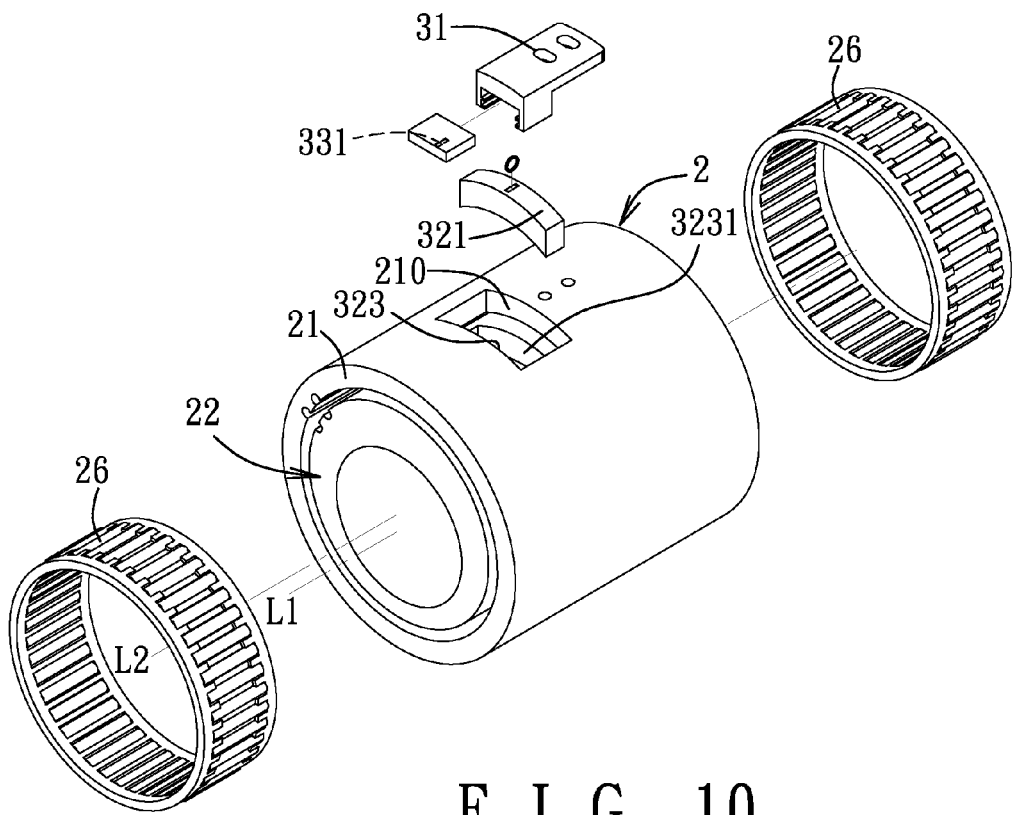
FIG. 10 is an exploded perspective view of the third preferred embodiment.
Figure 11:
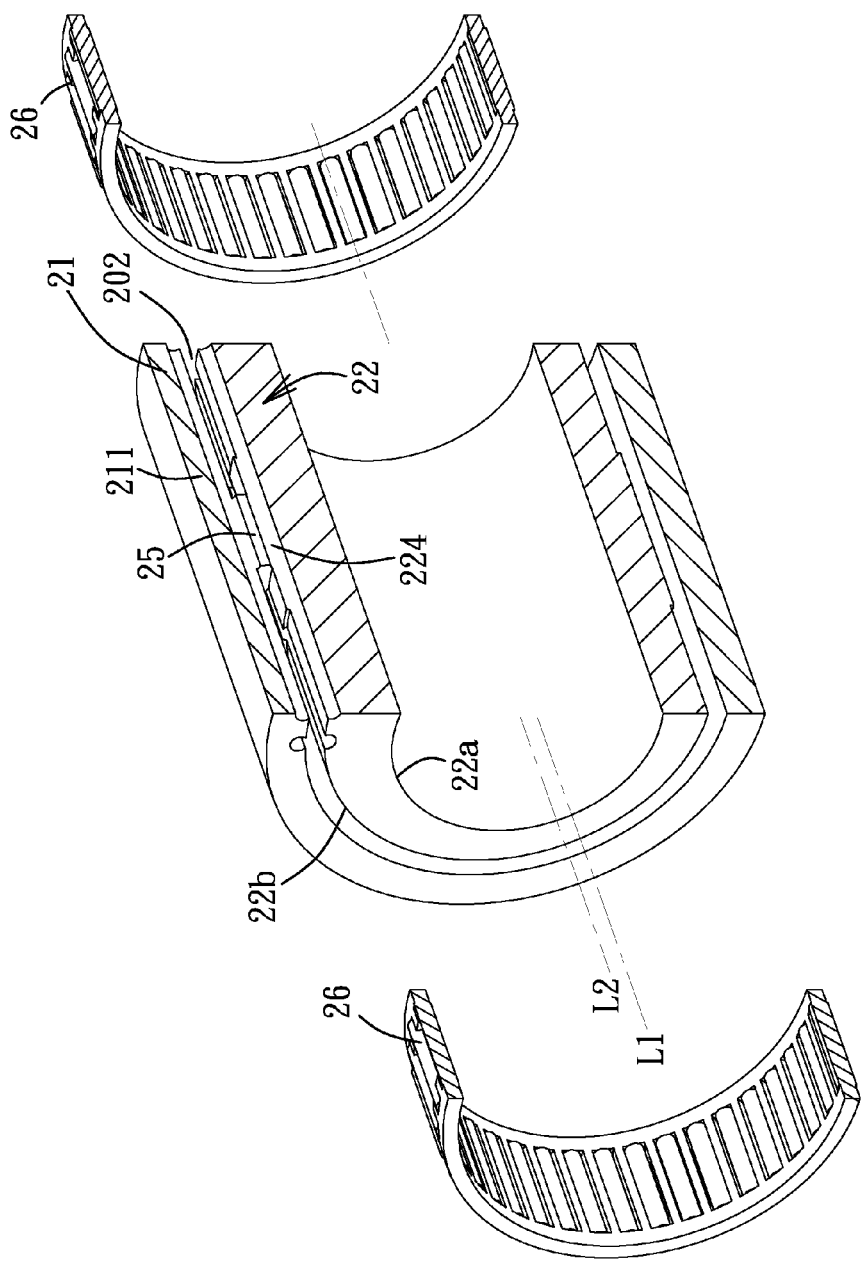
FIG. 11 is a partly sectioned, perspective view of the third embodiment.

Referring to FIGS. 9 to 11, a third preferred embodiment of the force measuring device 100 according to this invention is shown. In this embodiment, the bottom bracket shell 46 of the bicycle 4 and the outer tubular wall 21 of the sleeve shell 2 of the force measuring device 100 are integrally formed with each other. The sleeve shell 2 has an annular connecting wall 25 interconnecting the first middle segment 224 of the inner tubular wall 22 and the second middle segment 211 of the outer tubular wall 21 so as to divide the surrounding clearance 20 into right and left surrounding sub-clearances 201, 202. The force measuring device 100 further comprises right and left bearing members 26 which are respectively disposed to be fitted in the right and left surrounding sub-clearances 201, 202 so as to provide bracing between the outer and inner tubular walls 21, 22.

The ring body 32 is disposed at the right surrounding sub-clearance 201 and is integrally formed with the inner tubular wall 22. The bottom bracket shell 46 is configured to have a through hole 210 extending through the outer tubular wall 21 to communicate with the right sub-clearance 201 so as to permit the sensor holding unit 31 to be disposed unmoved with the outer tubular wall 21 and the bottom bracket shell 46. The ring body 32 is configured to have a fitting groove 3231 that permits the force transmitting mount 321 to be fitted therein. It can be clearly noted that in the third preferred embodiment, the forward and rearward abutment legs 212 of the outer tubular wall 21, and the forward and rearward arms 311 of the sensor holding unit 31 illustrated in the first and second preferred embodiments are omitted.

Additionally, the inner tubular wall 22 has outward and inward tubular surfaces 22b, 22a which are opposite to each other in radial directions, and which are configured to define a second spindle axis (L2) and the first spindle axis (L1), respectively. The second spindle axis (L2) is disposed offset from the first spindle axis (L1) and is disposed between the strain region 323 and the first spindle axis (L1) so as to permit the strain displacement to be enlarged thereby improving the sensibility of the sensor 331.

Referring to FIGS. 12 to 14, a fourth preferred embodiment of the force measuring device 100 according to this invention similar to the third preferred embodiment in construction is shown. The difference between the third and fourth preferred embodiments resides in that, in the fourth preferred embodiment, the sensor holding unit 31 includes forward and rearward abutment legs 212 which are spaced apart from each other in the forward direction, and an abutment wall 315 which extends to cooperate with the forward and rearward abutments legs 212 to define the sensor activating zone 313.

Additionally, the force transmitting mount 321 has a movable carrier 341 and a force transmitting member 342. The movable carrier 341 is configured to permit the magnetic member 332 to be mounted therein, and is movably disposed in the sensor activating zone 313. The force transmitting member 342 is disposed between the strain region 323 and the movable carrier 341, and is configured to transmit the strain displacement to urge the movable carrier 341 toward the abutment wall 315. The movable carrier 341 has a biasing end 344 which abuts against the abutment wall 315 to provide a biasing action to counteract the urging action of the strain displacement. In this embodiment, the force transmitting member 342 is in form of a ball, and the biasing end 344 is a compression spring.

Furthermore, the sensor 331 is spaced apart from the movable carrier 341 in the forward direction. Therefore, by virtue of the movable carrier 341, the magnetic member 332 is kept to be spaced apart from the sensor 331 so as to prevent contact with the sensor 331 during the displacement thereof. The force measuring device 100 further comprises forward and rearward bracing bridges 218, 219 which respectively span between the outer and inner tubular walls 21, 22, and which are disposed to be diametrical opposite to each other in the right surrounding sub-clearance 201. The forward bracing bridge 218 is configured to be shorter than the rearward bracing bridge 219 so as to permit the strain displacement to be enlarged thereby improving the sensibility of the sensor 331.

Figure 15:
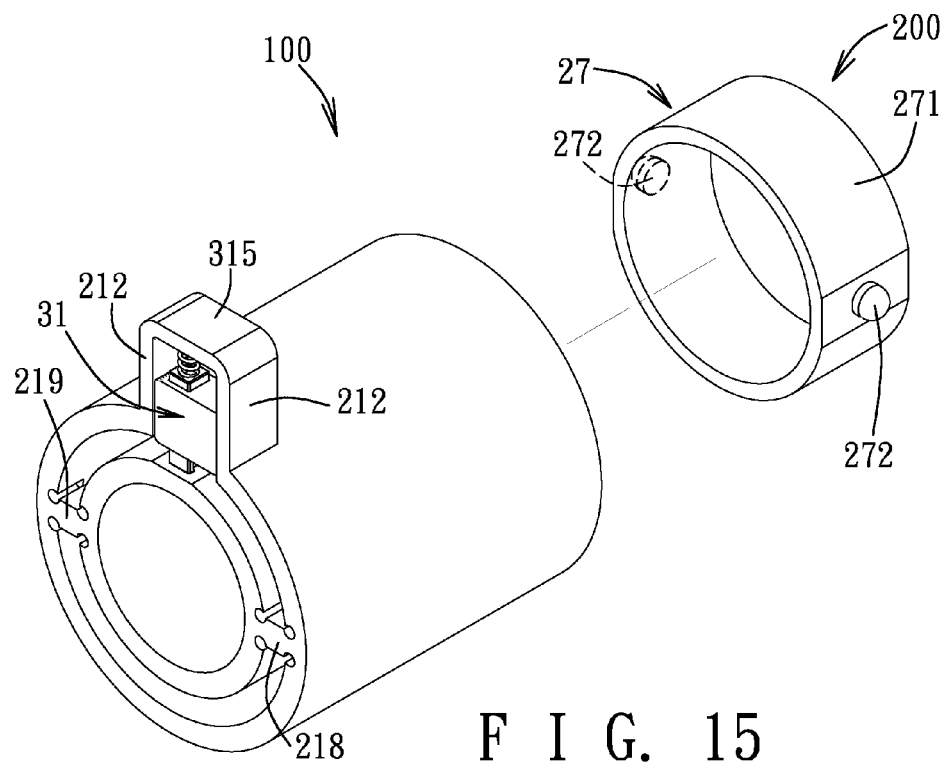
FIG. 15 is a partly exploded perspective view of a fifth preferred embodiment of the force measuring device according to this invention.
Figure 16:
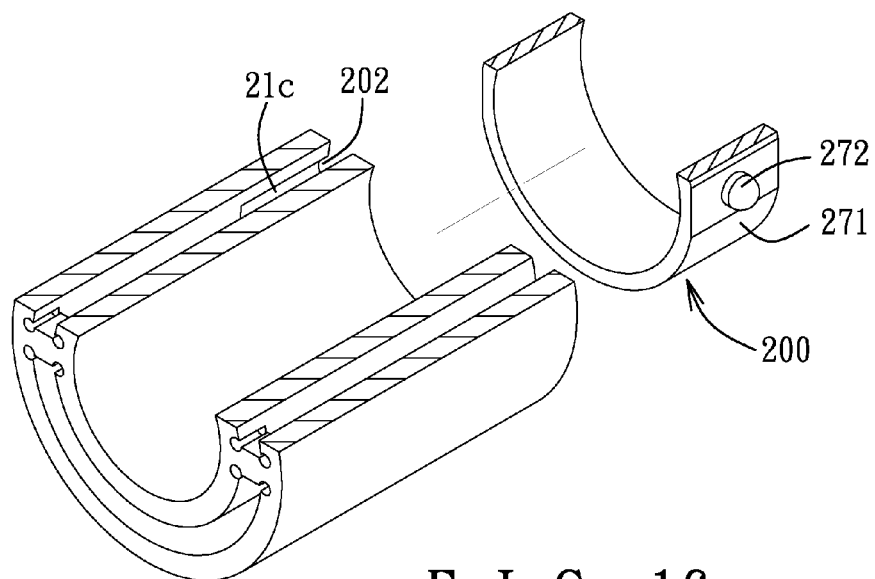
FIG. 16 is a partly sectioned, perspective view of the fifth preferred embodiment.

Referring to FIGS. 15 to 16, a fifth preferred embodiment of the force measuring device 100 according to this invention similar to the fourth preferred embodiment in construction is shown. The difference between the fourth and fifth preferred embodiments resides in that, in the fifth preferred embodiment, the forward and rearward legs 212 of the sensor holding unit 31 are formed integrally with the bottom bracket shell 46 of the bicycle 4 and the outer tubular wall 21, the abutment wall 315 extends to interconnect the forward and rearward abutment legs 212, and the forward and rearward bracing bridges 218, 219 have identical length.

Additionally, the force measuring device 100 further comprises a tubular insert 200 including a tubular body 271 and a pair of diametrically opposite protrusions 272 extending away from each other from the tubular body 271. The outer tubular wall 21 is formed with a pair of diametrically opposite slots 21c (only one is shown in FIG. 16) snugly engaging the protrusions 272 such that the tubular insert 200 is snugly fitted in the left surrounding sub-clearance 202 and movement in a circumferential direction between the outer and inner tubular walls 21, 22 is prevented.

Figure 17:
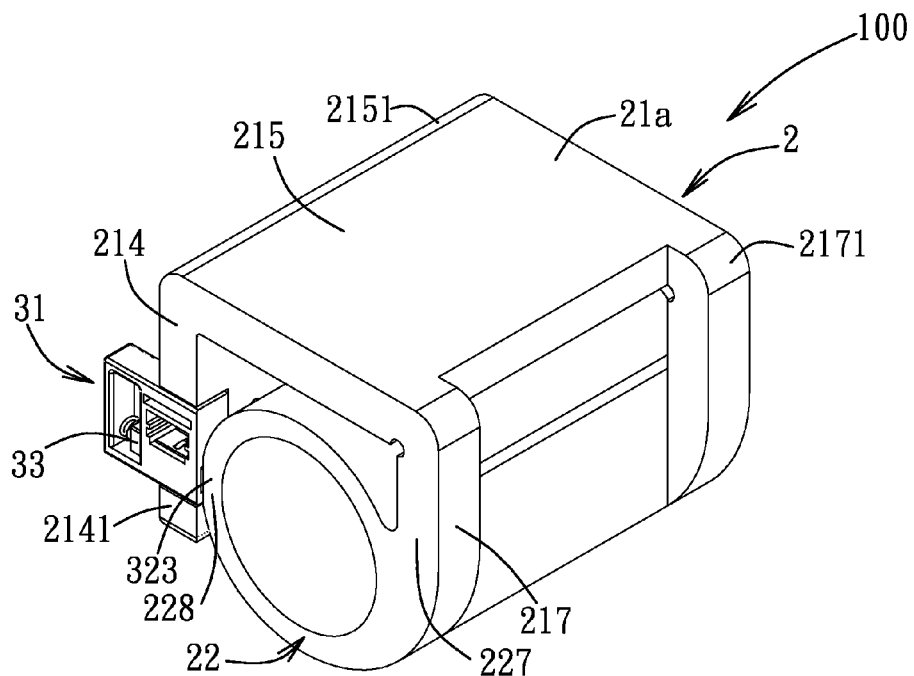
FIG. 17 is a perspective view of a sixth preferred embodiment of the force measuring device according to this invention.

Referring to FIG. 17, a sixth preferred embodiment of the force measuring device 100 according to this invention is shown. The sleeve shell 2 includes a first shell-half outer wall 21a including a forward wall segment 217, a cantilevered wall segment 215, and a rearward wall segment 214. The forward wall segment 217 extends upwardly from a forward lateral segment 227 of the inner tubular wall 22 to terminate at an upper mount end 2171. The cantilevered wall segment 215 extends rearward to terminate at a cantilevered end 2151. The rearward wall segment 214 extends downward to terminate at a lower end 2141 and is spaced apart from a rearward lateral segment 228 of the inner tubular wall 22. The strain region 323 is disposed on and integrally formed with the rearward lateral segment 228. The sensor holding unit 31 and the hall sensing unit 33 are disposed in the rearward wall segment 214 and the sensor holding unit 31 confronts the strain region 323 in the forward direction.

Figure 18:
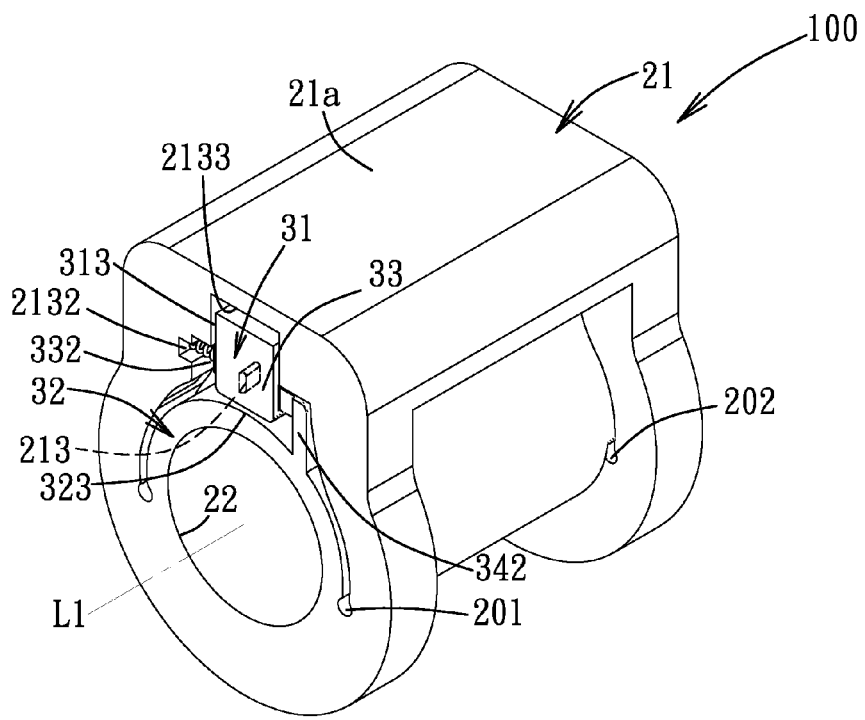
FIG. 18 is a perspective view of a seventh preferred embodiment of the force measuring device according to this invention.

Referring to FIG. 18, a seventh preferred embodiment of the force measuring device 100 according to this invention similar to the first preferred embodiment in construction is shown. In this embodiment, the sleeve shell 2 has a first shell-half outer wall 21a integrally formed with the bottom bracket shell 46. The surrounding clearance 20 has right and left surrounding sub-clearances 201, 202 opposite to each other in the direction of the first spindle axis (L1). The ring body 32 is disposed on and integrally formed with the inner tubular wall 22 at the right surrounding sub-clearance 201. The outer tubular wall 21 has a marginal cutout portion 213 which defines the sensor activating zone 313 and which extends circumferentially and rearward to terminate at a rearward barrier surface 2132 and an overhang surface 2133.

The sensor holding unit 31 is disposed fixedly in the marginal cutout portion 213 so as to ensure immovability of the sensor 331 (not shown) relative to the outer tubular wall 21 when the strain region 323 makes the strain displacement. The ring body 32 includes a force transmitting member 342 which extends from the strain region 323 toward the overhang surface 2133, and which is configured to transmit the strain displacement of the strain region 323 to urge the magnetic member 332 of the hall sensing unit 33 toward the rearward barrier surface 2132.

Referring to FIGS. 19 to 20, an eighth preferred embodiment of the force measuring device 100 according to this invention is similar to the seventh preferred embodiment in construction, except that the sleeve shell 2 further includes a second shell-half outer wall 21b configured to mate with the first shell-half outer wall 21a so as to form an outer tubular wall 21 which surrounds and is spaced apart from the inner tubular wall 22 by the surrounding clearance 20. Moreover, the second shell-half outer wall 21b is formed integrally with the bottom bracket shell 46, the tubular outer wall 21 is formed with two engaging grooves 203 at an inner surface confronting the surrounding clearance 20, and the inner tubular wall 22 is formed with two engaging protrusions 294 which extend radially and outwardly toward the surrounding clearance 20 and which snugly and respectively engage the grooves 203 such that movement in a circumferential direction between the outer and inner tubular walls 21, 22 is prevented.

As illustrated, the force measuring device 100 of this invention is adapted to be mounted in the bottom bracket assembly of the bicycle 4 to detect deformation of the sleeve shell 2 during pedaling of the bicycle 4 so as to accurately measure the treading force applied to the bicycle.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A force measuring device for mounting in a bottom bracket assembly of a bicycle, the bottom bracket assembly including a bottom bracket shell which is connected to a seat tube, a down tube, and chain stays of the bicycle, and which has a right shell segment, a spindle to which a crankset and a chainwheel are connected, which is rotatably mounted relative to the bottom bracket shell about a first spindle axis, and which has a right spindle segment that is spacedly surrounded by the right shell segment, and an antifriction bearing unit which is disposed between the spindle and the bottom bracket shell, said force measuring device comprising:

a sleeve shell inserted between the spindle and the bottom bracket shell, and having a first shell-half outer wall and an inner tubular wall which are radially spaced apart from each other to define a circumferentially extending surrounding clearance, and which are in abutting engagement with the right shell segment of the bottom bracket shell and the antifriction bearing unit, respectively;

a ring body which is disposed on and movable with said inner tubular wall, and which has an outer ring surface that confronts and is spaced apart from said first shell-half outer wall, said outer ring surface having a strain region which makes a strain displacement corresponding to a treading force exerted on the spindle;

a sensor holding unit which defines a sensor activating zone that confronts said strain region, and which is disposed to be unmoved with said first shell-half outer wall; and a hall sensing unit including
a sensor disposed in said sensor activating zone and held to be unmoved relative to said sensor holding unit, and
a magnetic member disposed to be displaceable with the strain displacement of said strain region, and spaced apart from said sensor by a predetermined distance such that a magnetic field generated thereby is changed when said magnetic member is displaced with the strain displacement so as to give off a signal indicative of the magnitude of the treading force.

2. The force measuring device as claimed in claim 1, wherein said sleeve shell further includes a second shell-half outer wall mating with said first shell-half outer wall so as to form an outer tubular wall which surrounds and is spaced apart from said inner tubular wall by said surrounding clearance.

3. The force measuring device as claimed in claim 2, further comprising a force transmitting mount which is disposed on said strain region, which extends radially toward said sensor activating zone, and which permits said magnetic member to be mounted therein.

4. The force measuring device as claimed in claim 3, wherein said sensor holding unit includes forward and rearward arms which extend upwardly from said strain region to cooperatively define said sensor activating zone.

5. The force measuring device as claimed in claim 4, wherein said forward and rearward arms are spaced apart from each other in a forward direction transverse to a direction of the first spindle axis, and respectively have forward and rearward lower segments which are disposed on said strain region, and which cooperatively flank said force transmitting mount.

6. The force measuring device as claimed in claim 5, wherein said outer tubular wall has a marginal cutout portion which extends circumferentially to terminate at forward and rearward barrier surfaces, said sensor holding unit being fitted in said marginal cutout portion such that said forward and rearward lower segments are respectively brought into abutting engagement with said forward and rearward barrier surfaces so as to ensure immovability of said sensor relative to said outer tubular wall when said strain region makes the strain displacement.

7. The force measuring device as claimed in claim 6, wherein said forward and rearward arms respectively have forward and rearward upper segments which respectively extend uprightly from said forward and rearward lower segments so as to cooperatively define said sensor activating zone.

8. The force measuring device as claimed in claim 7, further comprising forward and rearward abutment legs which extend uprightly from said forward and rearward barrier surfaces respectively to abut against said forward and rearward upper segments respectively so as to ensure immovability of said sensor relative to said outer tubular wall.

9. The force measuring device as claimed in claim 8, wherein said sleeve shell has a tubular connecting wall which is disposed to interconnect said outer and inner tubular walls, and which is distal from said ring body and adjacent to a left spindle segment of the spindle along the first spindle axis, and a pair of slots which are diametrically opposite to each other, and which respectively extend circumferentially and axially to be in spatial communication with said surrounding clearance so as to reduce the rigidity of said tubular connecting wall.

10. The force measuring device as claimed in claim 8, wherein said sleeve shell has a straining annular body which is disposed to sleeve on a first middle segment of said inner tubular wall so as to moved therewith, and which abuts against a second middle segment of said outer tubular wall so as to permit said second middle segment to be strained by a straining force which is exerted on said straining annular body, and which corresponds to the treading force, said outer tubular wall having a plurality of cutout slots which are disposed between said second middle segment and said ring body, and which are angularly displaced from one another about the first spindle axis so as to permit the strain displacement to be enlarged when said straining force is transmitted through said rearward lower segment of said rearward arm onto said strain region thereby improving the sensibility of said sensor.

11. The force measuring device as claimed in claim 3, wherein the bottom bracket shell and said outer tubular wall are integrally formed with each other, said sleeve shell has an annular connecting wall to interconnect a first middle segment of said inner tubular wall and a second middle segment of said outer tubular wall so as to divide said surrounding clearance into right and left surrounding sub-clearances, said ring body being disposed at said right surrounding sub-clearance and integrally formed with said inner tubular wall, the bottom bracket shell having a through hole which extends through said outer tubular wall to communicate with said right surrounding sub-clearance so as to permit said sensor holding unit to be disposed unmoved with said outer tubular wall, said ring body having a fitting groove so as to permit said force transmitting mount to be fitted therein.

12. The force measuring device as claimed in claim 11, further comprising right and left bearing members which are respectively disposed to be fitted in said right and left surrounding sub-clearances so as to provide bracing between said outer and inner tubular walls.

13. The force measuring device as claimed in claim 12, wherein said inner tubular wall has outward and inward tubular surfaces which are opposite to each other in radial directions, and which defines a second spindle axis and said first spindle axis, respectively, said second spindle axis being disposed offset from the first spindle axis and disposed between said strain region and the first spindle axis so as to permit the strain displacement of said strain region to be enlarged thereby improving the sensibility of said sensor.

14. The force measuring device as claimed in claim 3, wherein the bottom bracket shell and said outer tubular wall are integrally formed with each other, said surrounding clearance having right and left surrounding sub-clearances opposite to each other in a direction of the first spindle axis, said ring body being disposed on and integrally formed with a first middle segment of said inner tubular wall, the bottom bracket shell having an through hole which extends through said outer tubular wall to communicate with said right surrounding sub-clearance so as to permit said sensor holding unit to be disposed unmoved with said outer tubular wall, said sensor holding unit including forward and rearward abutment legs which are spaced apart from each other in a forward direction transverse to a direction of the first spindle axis to cooperatively define said sensor activating zone, and an abutment wall which extends to cooperate with said forward and rearward abutments legs to define said sensor activating zone, said force transmitting mount having
a movable carrier which permits said magnetic member to be mounted therein, and which is disposed in said sensor activating zone, and
a force transmitting member which is disposed between said strain region and said movable carrier, and which transmits the strain displacement to urge said movable carrier toward said abutment wall.

15. The force measuring device as claimed in claim 14, wherein said movable carrier has a biasing end which abuts against said abutment wall to provide a biasing action to counteract the urging action of the strain displacement, said force transmitting member being in form of a ball.

16. The force measuring device as claimed in claim 15, further comprising forward and rearward bracing bridges which respectively span between said outer and inner tubular walls, and which are disposed to be diametrical opposite to each other in said right surrounding sub-clearance, said forward bracing bridge being shorter than said rearward bracing bridge so as to permit the strain displacement to be enlarged thereby improving the sensibility of said sensor.

17. The force measuring device as claimed in claim 3, wherein the bottom bracket shell and said outer tubular wall are integrally formed with each other, said surrounding clearance having right and left surrounding sub-clearances opposite to each other in a direction of the first spindle axis, said ring body being disposed on and integrally formed with said inner tubular wall at said right surrounding sub-clearance, said sensor holding unit including forward and rearward abutment legs which are spaced apart from each other to cooperatively define said sensor activating zone, and an abutment wall which extends to interconnect said forward and rearward abutment legs, said force transmitting mount having
a movable carrier which permits said magnetic member to be mounted therein, and which is disposed in said sensor activating zone, and
a force transmitting member which is disposed between said strain region and said movable carrier, and which transmits the strain displacement to urge said movable carrier toward said abutment wall,
the force measuring device further comprising forward and rearward bracing bridges which respectively span between said outer and inner tubular walls, and which are disposed to be diametrical opposite to each other in said right surrounding sub-clearance; and a tubular insert which snugly fitting in said left surrounding sub-clearance.

18. The force measuring device as claimed in claim 1, wherein said ring body is formed integrally with said inner tubular wall, said first shell-half outer wall includes a forward wall segment which extends upwardly from a forward lateral segment of said inner tubular wall to terminate at an upper mount end, a cantilevered wall segment which extends rearward to terminate at a cantilevered end, and a rearward wall segment which extends downward to terminate at a lower end, and which is spaced apart from a rearward lateral segment of said inner tubular wall, said strain region being disposed on and integrally formed with said rearward lateral segment, said sensor holding unit and said hall sensing unit which are disposed in said rearward wall segment, and which confronts said strain region in a forward direction transverse to a direction of the first spindle axis.

19. The force measuring device as claimed in claim 1, wherein the bottom bracket shell and said first shell-half outer wall are integrally formed with each other, said surrounding clearance having right and left surrounding sub-clearances opposite to each other in a direction of the first spindle axis, said ring body being disposed on and integrally formed with said inner tubular wall at said right surrounding sub-clearance, said outer tubular wall having a marginal cutout portion which defines said sensor activating zone and which extends circumferentially and rearward to terminate at a rearward barrier surface and an overhang surface, said sensor holding unit being disposed fixedly in said marginal cutout portion so as to ensure immovability of said sensor relative to said outer tubular wall when said strain region makes the strain displacement, said ring body including a force transmitting member which extends from said strain region toward said overhang surface, and which transmits the strain displacement of said strain region to urge said magnetic member of said hall sensing unit toward said rearward barrier surface, said hall sensing unit being disposed between said rearward barrier surface and said force transmitting member.

20. The force measuring device as claimed in claim 2, wherein said bottom bracket shell and said second shell-half outer wall are integrally formed with each other, said surrounding clearance having right and left surrounding sub-clearances opposite to each other in a direction of said first spindle axis, said ring body being disposed on and integrally formed with said inner tubular wall at said right surrounding sub-clearance, said outer tubular wall having a marginal cut-out portion which defines said sensor activating zone and which extends circumferentially and rearward to terminate at a rearward barrier surface and an overhang surface, said sensor holding unit being disposed fixedly in said marginal cut-out portion so as to ensure immovability of said sensor relative to said outer tubular wall when said strain region makes the strain displacement, said ring body including a force transmitting member which extends from said strain region toward said overhang surface, and which transmits the strain displacement of said strain region to urge said magnetic member of said hall sensing unit toward said rearward barrier surface.

\* \* \* \* \*